United States Patent
Kim et al.

(10) Patent No.: US 10,621,362 B2
(45) Date of Patent: Apr. 14, 2020

(54) METHOD FOR AUTOMATICALLY DETECTING SECURITY VULNERABILITY BASED ON HYBRID FUZZING, AND APPARATUS THEREOF

(71) Applicant: KOREA INTERNET & SECURITY AGENCY, Naju-si, Jeollanam-do (KR)

(72) Inventors: Hwan Kuk Kim, Naju-si (KR); Tae Eun Kim, Naju-si (KR); Sang Hwan Oh, Naju-si (KR); Soo Jin Yoon, Naju-si (KR); Jee Soo Jurn, Naju-si (KR); Geon Bae Na, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 16/408,352

(22) Filed: May 9, 2019

(65) Prior Publication Data

US 2019/0266333 A1    Aug. 29, 2019

Related U.S. Application Data

(63) Continuation of application No. 15/817,372, filed on Nov. 20, 2017.

(30) Foreign Application Priority Data

Oct. 13, 2017    (KR) .................. 10-2017-0133153

(51) Int. Cl.
*G06F 21/00*     (2013.01)
*G06F 21/57*     (2013.01)
(Continued)

(52) U.S. Cl.
CPC ............ *G06F 21/577* (2013.01); *G06F 11/28* (2013.01); *G06F 11/3684* (2013.01); *G06F 2221/033* (2013.01)

(58) Field of Classification Search
CPC .............. G06F 11/0793; G06F 11/008; G06F 11/3636; G06F 11/3664; G06F 11/3612;
(Continued)

(56) References Cited

U.S. PATENT DOCUMENTS

| | | | |
|---|---|---|---|
| 9,454,659 B1 | 9/2016 | Daymont | |
| 2012/0072968 A1* | 3/2012 | Wysopal | G06F 11/3612 726/1 |
| 2015/0095895 A1* | 4/2015 | Taneja | G06F 11/3684 717/132 |

FOREIGN PATENT DOCUMENTS

| | | |
|---|---|---|
| EP | 2 058 747 A2 | 5/2009 |
| JP | 2016-167262 A | 9/2016 |

(Continued)

OTHER PUBLICATIONS

An Office Action issued by the Korean Patent Office dated Jul. 9, 2018, which corresponds to Korean Patent Application No. 10-2017-0133153 and is related to U.S. Appl. No. 15/817,372.
(Continued)

*Primary Examiner* — Tri M Tran
(74) *Attorney, Agent, or Firm* — Studebaker & Brackett PC

(57) ABSTRACT

Provided are a method and a system capable of efficiently detecting security vulnerability of program. The method includes: generating binary information including route information indicating an execution route of a program on a first test case; acquiring first crash information including the first test case and the route information when a crash of the first test case occurs; restoring a control flow graph based on the binary information; calculating complexity of the restored control flow graph; determining whether the complexity is less than a threshold value; only when a result of the determination indicates that the complexity is less than a threshold value, performing: executing a route detection
(Continued)

on the route information; generating a second test case by executing the route detection; and acquiring a second crash information including the second test case and the route information.

4 Claims, 10 Drawing Sheets

(51) Int. Cl.
*G06F 11/36* (2006.01)
*G06F 11/28* (2006.01)

(58) Field of Classification Search
CPC .. G06F 11/362; G06F 11/3684; G06F 21/577; G06F 2221/033
See application file for complete search history.

(56) References Cited

FOREIGN PATENT DOCUMENTS

| | | |
|---|---|---|
| KR | 10-2008-0037909 A | 5/2008 |
| KR | 10-2009-0044656 A | 5/2009 |
| KR | 10-1530132 B1 | 6/2015 |
| KR | 10-1568224 B1 | 11/2015 |

OTHER PUBLICATIONS

An Office Action issued by the Korean Patent Office dated Sep. 7, 2018, which corresponds to Korean Patent Application No. 10-2017-0133153 and is related to U.S. Appl. No. 15/817,372.

* cited by examiner

FIG. 9

```
[basic block] 0x804872a:0x8048752->0x8048753, 0x804875f
0x804872a   push ebp
0x804872b   mov ebp, esp
0x804872d   and esp, 0xfffffff0
0x8048730   sub esp, 0x20
0x8048733   mov dword ptr [esp+0x8], 0x1f
0x804873b   mov dword ptr [esp+0x4], 0x80489c0
0x8048743   mov dword ptr [esp], 0x1
0x804874a   call 0x80484dd
0x804874f   test eax, eax
0x8048751   je 0x804875f
```

(1)

```
main 0 804872a
0804872a [01]   push ebp
0804872b [02]   mov ebp, esp
0804872d [03]   and esp, 0xfffffff0
08048730 [03]   sub esp, 0x20
08048733 [08]   mov dword ptr [esp+0x8], 0x1f
0804873b [08]   mov dword ptr [esp+0x4], 0x80489c0
08048743 [07]   mov dword ptr [esp], 0x1
0804874a [05]   call 0x80484dd
0804874f [02]   test eax, eax
08048751 [02]   je 0x804875f
```

Adapted Metrics List

| Metric | Symbol | Formula | Description |
|---|---|---|---|
| Halstead metric | H.V | $H.V = N \times \log_2 n$ | Program volume<br>$N=N_1+N_2$<br>$N1$ : the total number of operators<br>$N2$ : the total number of operands<br>$n=n_1+n_2$<br>$n_1$ : the total number of unique operators<br>$n_2$ : the total number of unique operands |
| | H.N* | $H \cdot N^* = n_1 \times \log_2 n_1 + n_2 \times \log_2 n_2$ | Calculated program length |
| | H.D | $H.D = \frac{n_1}{2} \times \frac{N_2}{n_2}$ | Program complexity |
| | H.B | $H.B = \frac{E^{\frac{2}{3}}}{3000}$ | The number of delivered bugs<br>$E = H.D \times H.V$ |
| Jilb's metric | Jilb | $cl = \frac{CL}{n}$ | CL : the total number of condition operators (jmp, jxx, etc.)<br>N : the total number of operators |
| ABC metric | ABC | $ABC = \sqrt{A^2 + B^2 + C^2}$ | A : assignments count<br>B : branches count<br>C : cals count |
| Cyclomatic complexity | CC | $CC = e - v + 2$ | $e$ : the number of edges<br>$v$ : the number of nodes(basic blocks) |

METHOD FOR AUTOMATICALLY DETECTING SECURITY VULNERABILITY BASED ON HYBRID FUZZING, AND APPARATUS THEREOF

CROSS REFERENCE TO RELATED APPLICATION

This application is a Continuation Application of U.S. patent application Ser. No. 15/817,372 filed Nov. 20, 2017, which claims priority to Korean Patent Application No. 10-2017-0133153, filed on Oct. 13, 2017, in the Korean Intellectual Property Office, and all the benefits accruing therefrom under 35 U.S.C. § 119, the disclosures of the above-mentioned applications are incorporated herein by reference in its entirety.

BACKGROUND

1. Field of the Invention

The present invention relates to a system, a method, and a program for detecting whether security vulnerability of a program exists. More specifically, the present invention relates to a system, a method, and a program for detecting whether there is security vulnerability in which program is abused for purposes other than the purpose designed by a program designer and the program may not operate properly.

2. Description of the Related Art

In the development process of the program, the analysis of the program is performed, in general, by setting a breakpoint at a place where there is a possibility of occurrence of vulnerability in a source code, using a debugging program, and by observing the execution environment of the program, when the execution is stopped in accordance with the breakpoint during execution of the program.

However, when analyzing the vulnerability of the program after the program is distributed, rather than the development process of program, the analysis process is mostly executed under the environment in which the source code cannot be obtained. Thus, there is a problem that the program may not be analyzed through the source code. Therefore, the vulnerability analysis of program requires an analysis method in the form of a black box test which can be executed only by an executable file. Here, the black box test is a test method in which analysis is executed on the basis of input and output values of software, by assuming that the program is a black box that may not observe the internal operation.

However, according to the conventional black box test, there is a high possibility that only the vulnerability existing in a shallow route among the program execution routes is detected, and in order to analyze the vulnerability existing in the deep routes, there is a problem that too much amount of computation is required.

SUMMARY

Aspects of the present invention provide a method and a system capable of efficiently detecting the security vulnerability of program only by a binary analysis without a source code.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the inventive concept, there is provided a method for detecting vulnerability, the method includes: generating binary information including route information indicating an execution route of a program on a first test case; acquiring first crash information including the first test case and the route information when a crash of the first test case occurs; restoring a control flow graph based on the binary information; calculating complexity of the restored control flow graph; determining whether the complexity is less than a threshold value; only when a result of the determination indicates that the complexity is less than a threshold value, performing: executing a route detection on the route information; generating a second test case by executing the route detection; and acquiring a second crash information including the second test case and the route information; and outputting the first crash information or the second crash information to another external computing device.

According to an aspect of the inventive concept, there is provided a system for detecting vulnerability, the system includes: a vulnerability detector that generates binary information including route information indicating an execution route of a program on a first test case, and acquires first crash information including the first test case and the route information when a crash of the first test case occurs; a binary analyzer that restores a control flow graph based on the binary information, calculates complexity of the restored control flow graph, and executes a route detection on the route information only when the complexity is less than a first threshold value; a route detector that generates a second test case by executing the route detection and acquires a second crash information including the second test case and the route information; and a processor that transmits the first crash information or the second crash information to another external computing device.

According to an aspect of the inventive concept, there is provided a non-transitory computer readable recording medium storing a computer program coupled to a computer device including a processor to execute a method of detecting vulnerability, the program being configured to execute operations comprising: generating binary information including route information indicating an execution route of a program on a first test case; acquiring first crash information including the first test case and the route information when a crash of the first test case occurs; restoring a control flow graph based on the binary information; calculating complexity of the restored control flow graph; determining whether the complexity is less than a threshold value; only when a result of the determination indicates that the complexity is less than a threshold value, performing: executing a route detection on the route information; generating a second test case by executing the route detection; and acquiring a second crash information including the second test case and the route information; and outputting the first crash information or the second crash information to another external computing device.

BRIEF DESCRIPTION OF THE DRAWINGS

The above and other aspects and features of the present invention will become more apparent by describing in detail exemplary embodiments thereof with reference to the attached drawings, in which:

FIGS. 8 and 9 are exemplary views for explaining a method of restoring a control flow graph according to an embodiment of the present invention;

FIG. 10 is a diagram illustrating an example of a complexity analysis metrics used for a complex analysis according to an embodiment of the present invention.

DETAILED DESCRIPTION OF THE EMBODIMENTS

Figure 1:
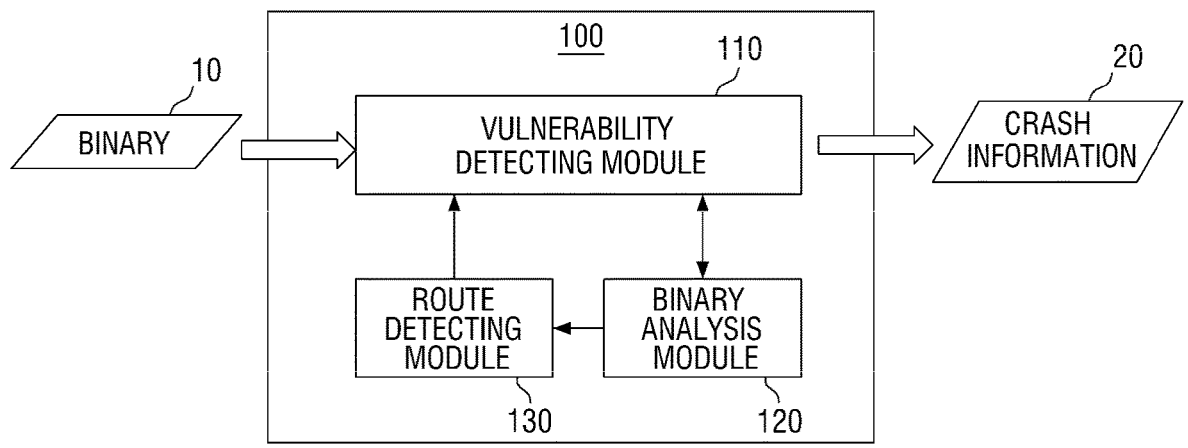
FIG. 1 is a block diagram illustrating the structure of a vulnerability detecting system according to an embodiment of the present invention.

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thickness of layers and regions are exaggerated for clarity.

Hereinafter, some embodiments of the present invention will be described with reference to the drawings.

FIG. 1 is a block diagram illustrating a structure of a vulnerability detecting system 100 according to an embodiment of the present invention.

The vulnerability detecting system 100 according to an embodiment may be configured to include one or more computing devices for collecting binary information 10 of a program to output crash information 20. Alternatively, the vulnerability detecting system 100 may be configured as a part of a single computing device equipped with several systems. For example, the vulnerability detecting system 100 may be configured in the form of a server which outputs the crash information 20 of the program as a result of analyzing the binary information 10 of the program to another server having a cause analysis module for analyzing the cause of the security vulnerability. As another example, the vulnerability detecting system 100 may be configured to output the crash information 20 to another module as a module provided in one server.

According to an embodiment, the vulnerability detecting system 100 may include a vulnerability detecting module 110, a binary analysis module 120, and a route detecting module 130. Each of the modules illustrated in FIG. 1 may be physically configured in a single device, or may be configured to be distributed.

According to an embodiment, the vulnerability detecting module 110 may analyze the binary information 10 of the program and may acquire the crash information 20 when a crash occurs in the analysis result program.

Here, the binary information may mean information obtained by analyzing an execution file in the program. Binary information may include one or more of program route information and branch coverage. In particular, the route information may mean trace information of a route that has passed as the program is executed. For example, the route information may include an assembly code of an incoming route. Also, the branch coverage may mean a value obtained by counting the branch through which a route passes. The analyzed binary information may be accumulated and stored in the form of a database or a file in accordance with the embodiment.

Further, crash means that an external attacker causes malfunction of the program for purposes not intended by the program designer due to security vulnerability present in the program, thereby causing the program malfunction. Therefore, the crash information may mean information indicating what type of malfunction occurs when the input value is input and the program is operating in any execution route. For example, in a case where a crash occurs when using the first test case as an input value, the crash information includes a first test case in which a crash occurs, route information in which a crash occurs, and a crash dump.

According to an embodiment, the binary analysis module 120 may determine the priority of the binary information, by performing a risk analysis of the binary information. The binary analysis module 120 may update the binary information generated by the vulnerability detecting module 110 in accordance with the determined priority. The vulnerability detecting module 110 may select binary information to preferentially detect vulnerability in accordance with the priority of the binary information set by the binary analysis module 120. Further, the binary analysis module 120 may determine the conformity of the route detection of the binary information, using the result of executing the risk analysis. That is, the binary analysis module 120 may determine whether or not to execute the route detection, depending on whether the binary information is suitable as a target for executing the route detection.

According to an embodiment, the route detecting module 130 may perform the route detection of a route determined to be suitable for a target of the route detection. The route detecting module 130 may generate a new input value to be input to the vulnerability detecting module 110 as a result of the route detection. For example, when the vulnerability detecting module 110 detects the vulnerability on the basis of the first test case, the route detecting module 130 may generate the second test case as a result of executing the route detection. The vulnerability detecting module 110 may analyze a test case of a higher probability of a crash occurrence by detecting the vulnerability for the second test case.

Figure 2:
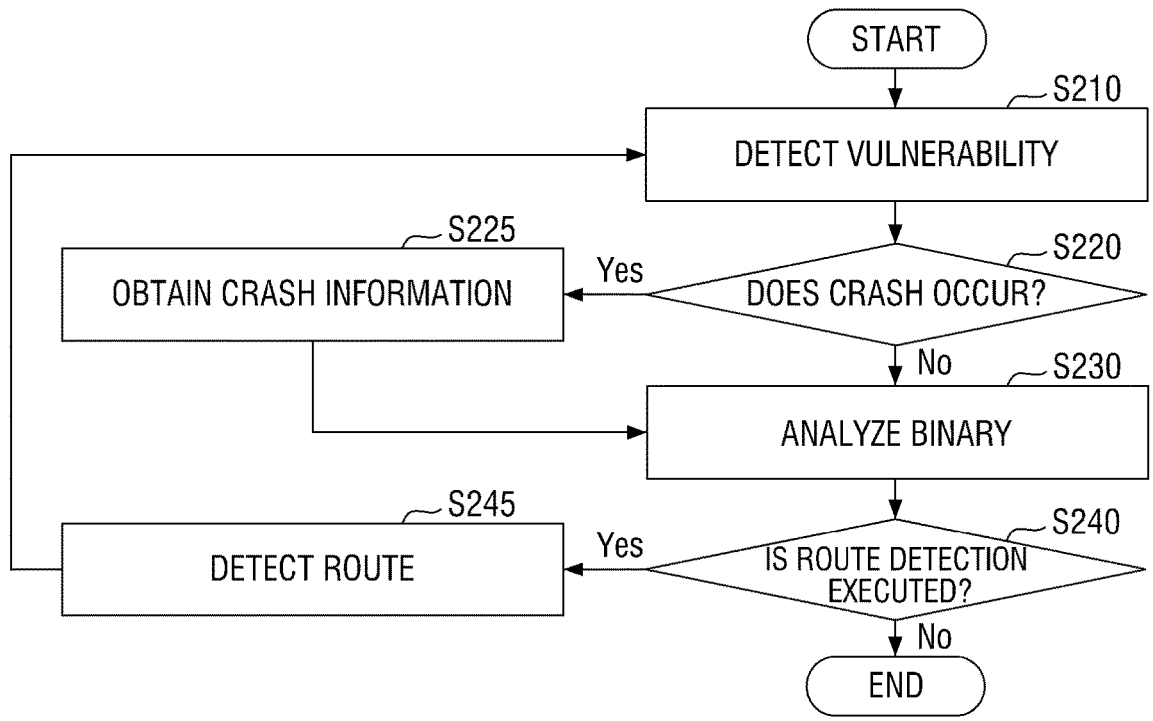
FIG. 2 is a flowchart illustrating a process of detecting vulnerability according to an embodiment of the present invention.

FIG. 2 is a flowchart illustrating a process of detecting vulnerability in accordance with an embodiment of the present invention.

Figure 3:
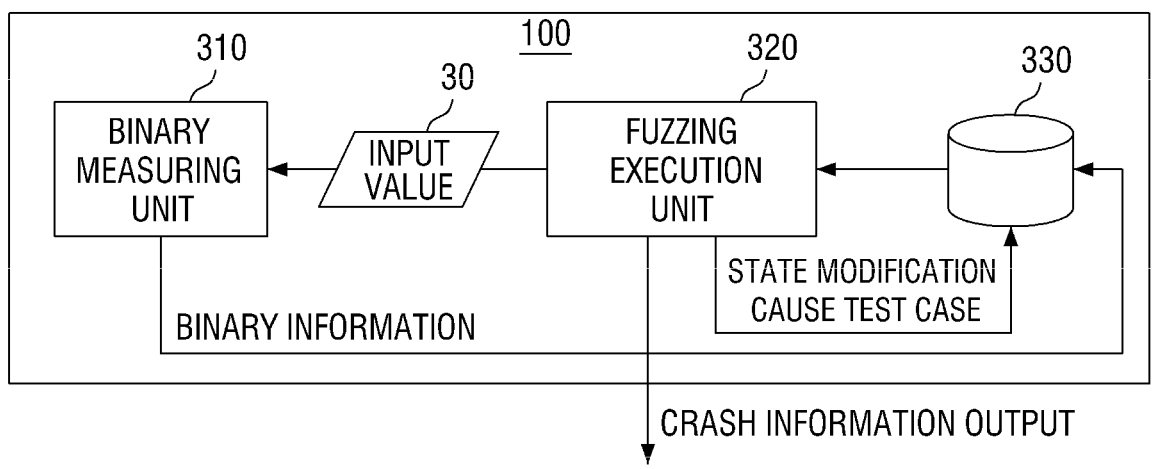
FIG. 3 is a diagram for explaining the operation of the vulnerability detecting module according to the embodiment of the present invention.
Figure 4:
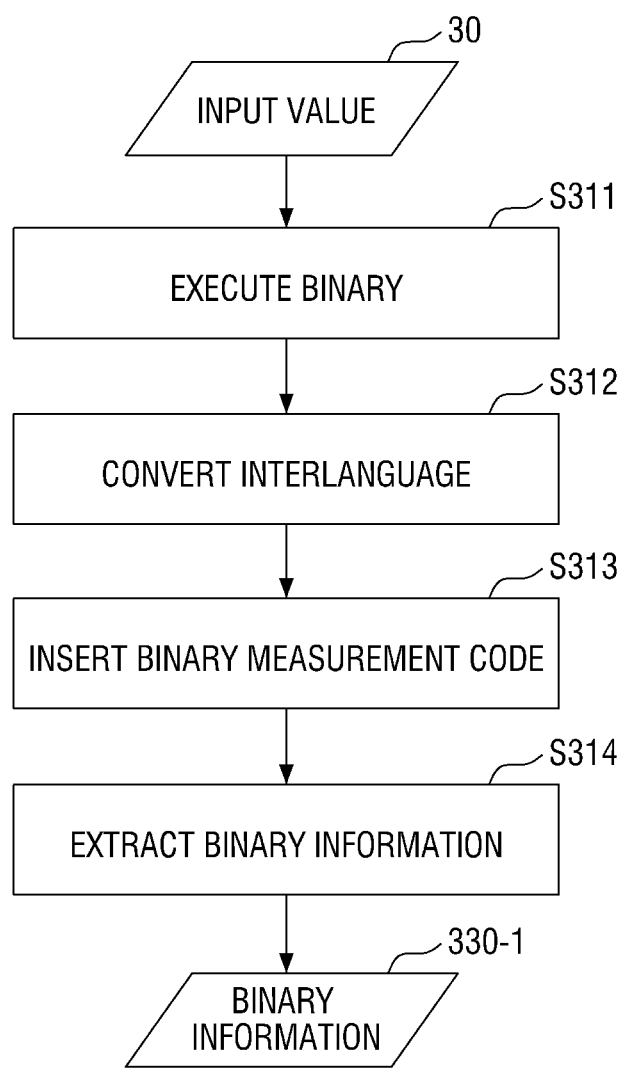
FIG. 4 is a diagram for explaining the operation of a binary measurement unit according to an embodiment of the present invention.
Figure 5:
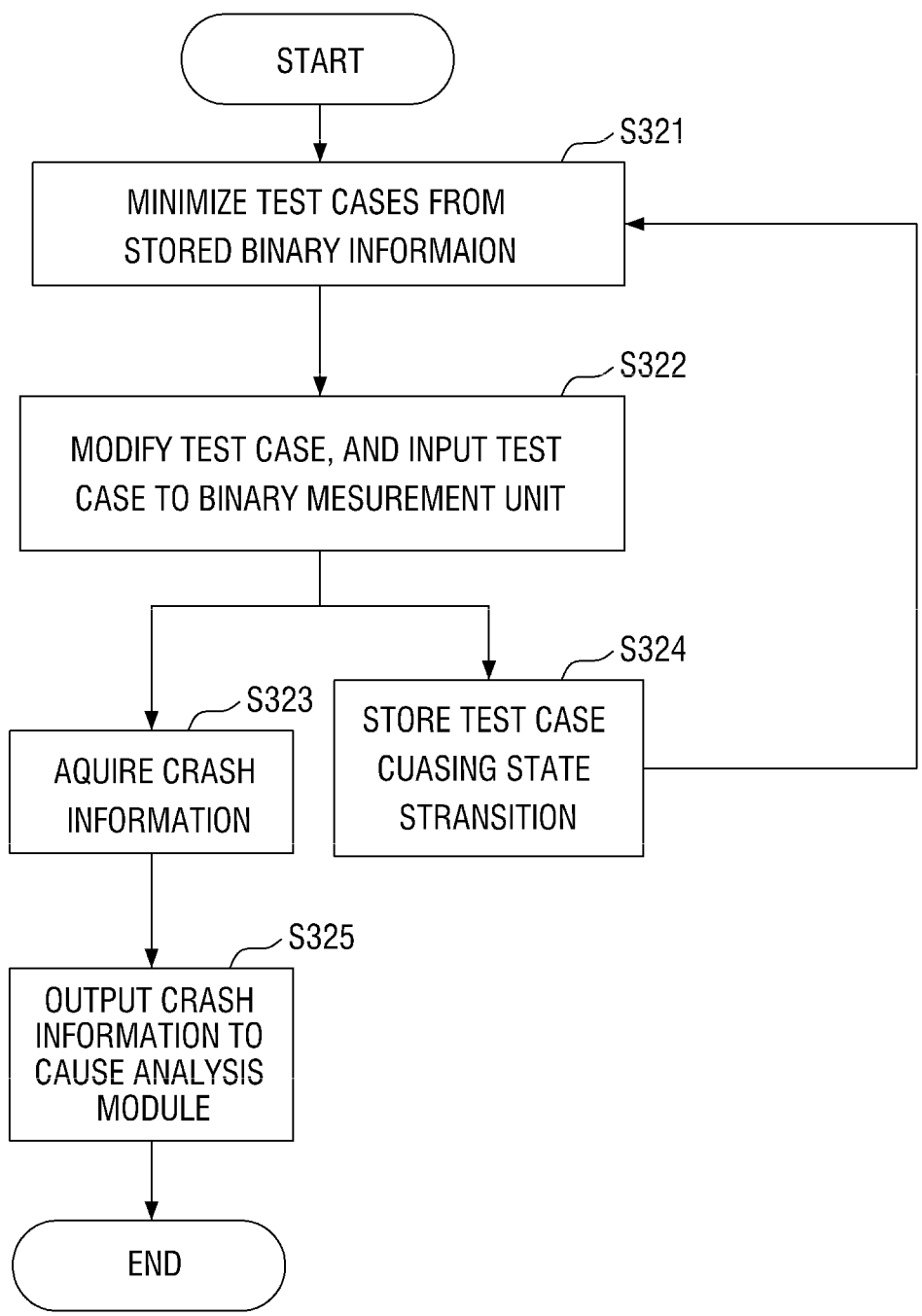
FIG. 5 is a diagram for explaining the operation of a fuzzing execution unit according to an embodiment of the present invention.

In step S210, the vulnerability detecting system 100 may execute the vulnerability detecting procedure of extracting the binary information from the program and acquiring the crash information which is information in the case of occurrence of crash on the basis of the binary information. According to an embodiment, in the vulnerability detection step, the vulnerability detecting system 100 may generate binary information of the test case. According to an embodiment, the generated binary information may be stored by accumulating the test case, the route information, and the branch coverage in the form of the database or file as a set. Further, the vulnerability detecting system 100 may determine whether a crash of the first test case occurs on the basis of the route information included in the binary information. If a crash of the first test case occurs in step S220, the vulnerability detecting system 100 may acquire the crash information including the first test case, the route information, and the crash dump in step S225. To explain the vulnerability detecting steps in more detail, an embodiment in which the vulnerability detecting module 110 of the vulnerability detecting system 100 executes the vulnerability detecting step is illustrated in FIGS. 3 to 5.

After that, in step S230, the vulnerability detecting system 100 may execute the binary analysis step on the stored binary information. In the binary analysis step, the vulnerability detecting system 100 may perform the risk analysis on the basis of the route information included in the binary information. The vulnerability detecting system 100 may update the binary information so that the high risk route calculated as a result of executing the risk analysis has higher priority. That is, it is possible to preferentially perform the vulnerability detecting step on a route having a high priority.

Figure 6:
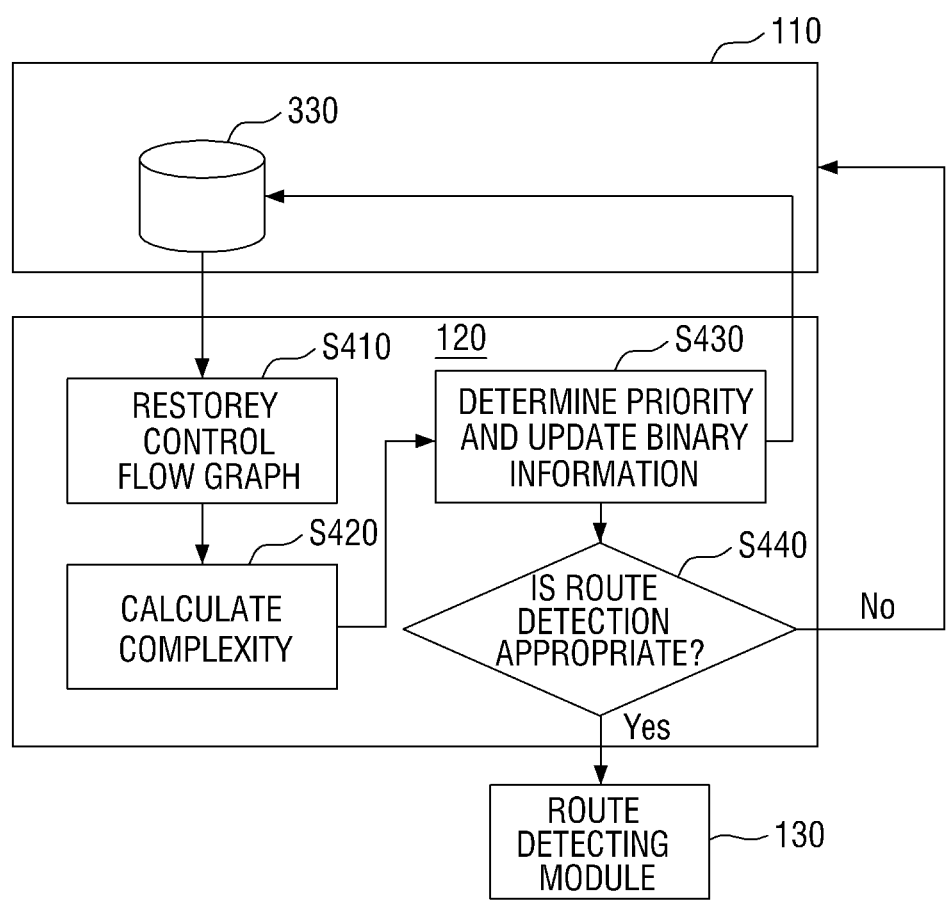
FIG. 6 is a diagram for explaining the operation of the binary analysis module according to an embodiment of the present invention.

Also, on the basis of the result of the risk analysis executed in the binary analysis step, the vulnerability detecting system 100 may determine whether or not to execute the route detection on the route information in step S240. According to an embodiment, the complexity of the route information may be calculated in the process of executing the risk analysis. In this case, the vulnerability detecting system 100 may determine whether to perform the route detection on the basis of the complexity. That is, the route detection may not be performed on the routes with excessively high complexity. An example in which the binary analysis module 120 of the vulnerability detecting system 100 performs the binary analysis step is illustrated in FIG. 6 in order to explain the binary analysis step in more detail.

Figure 7:
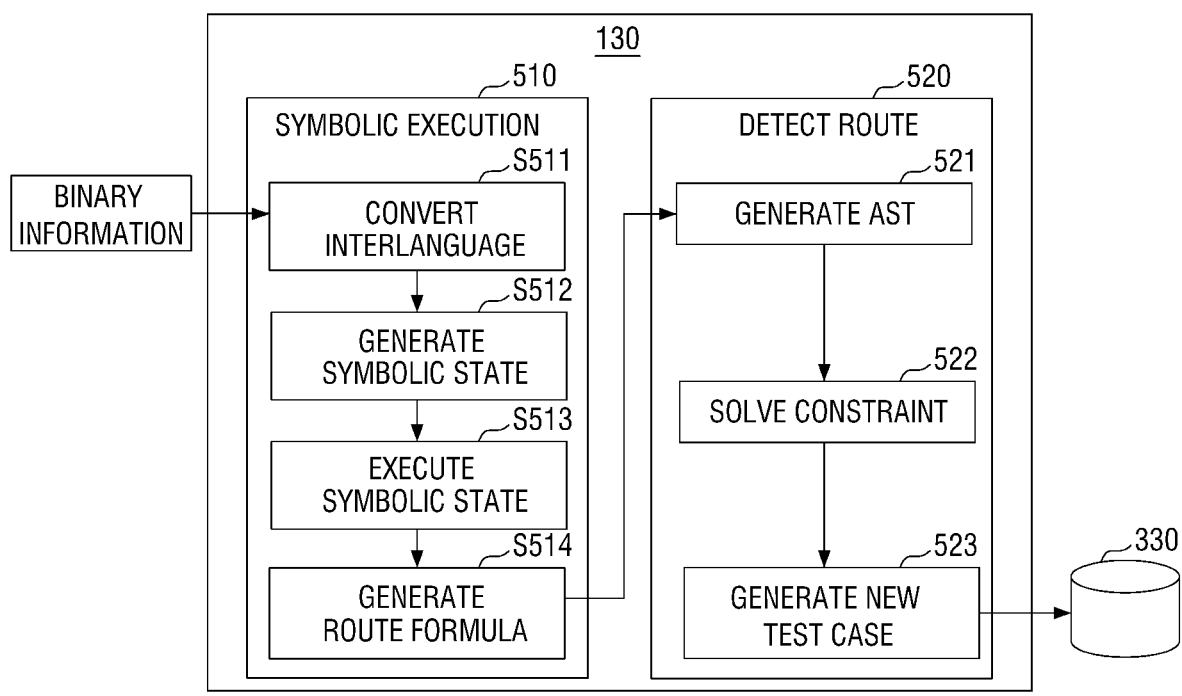
FIG. 7 is a diagram for explaining the operation of the route detecting module according to an embodiment of the present invention.

When it is determined that it is suitable for performing the route detection in step S240, the vulnerability detecting system 100 may perform the route detection step in step S245. The vulnerability detecting system 100 may generate a new test case by executing the route detection step of the target route. A new test case may have characteristics of higher possibility of the crash occurrence. That is, the vulnerability detecting system may execute the vulnerability detection of the test case with high possibility of a crash occurrence by executing the vulnerability detecting step S210 on the new test case again. In order to explain the route detection step in more detail, an embodiment in which the route detecting module 130 of the vulnerability detecting system 100 executes the route detection step is illustrated in FIG. 7.

FIG. 3 is a diagram for explaining the operation of the vulnerability detecting module according to the embodiment of the present invention.

The vulnerability detecting module 110 according to an embodiment may include a binary measurement unit 310 for extracting binary information, a fuzzing execution unit 320 for acquiring crash information by performing the fuzzing, and a storage unit 330. However, the invention is not limited thereto.

The binary measurement unit 310 may generate the binary information on the basis of the input value 30. Here, the input value 30 may be a test case modified by the fuzzing execution unit 320, and may be a test case generated individually. The binary information generated by the binary measurement unit 310 may be stored in the storage unit 330 in the form of a database or a file.

The fuzzing execution unit 320 may perform fuzzing on the binary information stored in the storage unit 330. The fuzzing, which is one of the black box tests, is also referred to as fuzz testing, and is an analytical method which inputs various random data to the program, detects an abnormal operation executed in the program in accordance with the input value, and finds a detect in which the program cannot handle. The fuzzing may be performed in the process of creating a task case including the random data, and sequentially executing the generated test cases by the program to analyze the malfunction of the program. The fuzzing provides a random sample of the system behavior and may prove whether the program may perform the exception handling without crashing. The fuzzing program may be divided into two categories. A generation-based fuzzer defines new test data on the basis of model of input, and a modification-based fuzzer converts the existing data sample into test data.

The fuzzing execution unit 320 may generate a test case as the input value 30 of the binary measurement unit 310, and when a crash occurs as a result of executing the fuzzing, the crash information may be acquired. The acquired crash information may be output to the outside. For example, the acquired crash information is output to a cause analysis system, so that the cause of the crash occurrence may be analyzed. Further, if there is a test case that causes a state transition as a result of executing the fuzzing, the test case that causes the state transition may be stored in the storage unit 330.

FIG. 4 is a diagram for explaining the operation of the binary measurement unit according to an embodiment of the present invention.

According to an embodiment, in step S311, the binary measurement unit 310 may perform the binary execution on the input value 30. Here, the binary measurement unit 310 may perform the binary execution of the program in a virtualization environment. The virtualization environment, for example, means an environment in which a program stack may be executed on a virtual machine, using virtualization software such as QEMU. The QEMU is virtualization software that executes the entire software stack made for models other than x86 on a virtual machine, using a dynamic converter (portable dynamic translation).

After that, in step S312, the binary measurement unit 310 may convert the program into an interlanguage. After that, in step S313, the binary measurement unit 310 may insert a binary measurement code for measuring the branch coverage into the program converted into the interlanguage. For example, code that increases the count each time an IF statement is called may be inserted as a binary measurement code.

Thereafter, in step S314, the binary measurement unit 310 may extract the binary information 330-1 as the program is executed. The binary measurement unit 310 may accumulate and store the extracted binary information 330-1 in the storage unit 330.

FIG. 5 is a diagram for explaining the operation of the fuzzing execution unit according to an embodiment of the present invention.

First, in step S321, the fuzzing execution unit 320 executes a process for minimizing the test cases from the binary information stored in the storage unit 330. The process for minimizing the test cases is a process of extracting a minimum test case in the initial test case. The step S321 may be executed, using a software tool or a divide and conquer method.

After that, in step S322, the fuzzing execution unit 320 may modify the test case. Here, the method of modifying the test case may be variously applied in accordance with the embodiment. For example, the fuzzing execution unit 320 may modify the test case, on the basis of a bit modification, an operation-based modification, a dictionary-defined test case modification or a dictionary-based modification. Alternatively, the test case may be modified on the basis of a fusion type modification technique in which two or more of the aforementioned modification methods are fused. Here, the bit modification means modification in units of second bit unit by skipping the first bit unit. The calculation-based modification means that the addition or subtraction is repeated by skipping the small integer values of values of 8 bits, 16 bits, and 32 bits at every 8 bits. The dictionary-defined test case-based modification means that the values of 8 bits, 16 bits, and 32 bits defined in dictionary are overwritten by skipping at every 8 bits. The dictionary-based modification means that data existing on the basis of dictionary is overwritten or is inserted into remaining data at a position separated by offset. The test case modified in step S322 may be input to the input value 30 of the binary measurement unit 310.

After that, in step S323, the fuzzing execution unit 320 may acquire the crash information when a crash occurs. The acquired crash information may be output to the cause analysis module and the cause analysis system in step S325. Also, in step S324, the fuzzing execution unit 320 may store the test case that causes the state transition in the storage unit 330.

FIG. 6 is a diagram for explaining the operation of the binary analysis module according to an embodiment of the present invention.

First, in step S410, the binary analysis module 120 may restore a control flow graph (CFG) on the basis of the binary information stored in the storage unit 330 by the vulnerability detecting module 110. According to an embodiment, the binary analysis module 120 may restore the CFG, on the basis of the assembly code of the route which is the route information among the information included in the binary information.

After that, in step S320, the binary analysis module 120 may calculate the complexity on the basis of the CFG restored in the process of calculating the risk of the route. Here, the binary analysis module 120 may calculate the complexity, using the complex analysis metrics. Referring to FIG. 10, FIG. 10 illustrates an example of a complexity analysis metrics used for the complexity analysis in accordance with an embodiment of the present invention. It should be noted, however, that the present invention is not limited to usage of only the complexity analysis metrics illustrated in FIG. 10. In the present specification, the present invention will be described on the basis of an example of analyzing the complexity, using Halstead metric among the complexity analysis metrics illustrated in FIG. 10.

In order to calculate complexity and risk using Halstead metric, variables may be defined as illustrated in Table 1 below.

TABLE 1

| Variables | Definition |
| --- | --- |
| $n_1$ | Number of distinct operators |
| $n_2$ | Number of distinct operands |
| $N_1$ | Number of total operators |
| $N_2$ | Number of total operands |
| n | $n_1 + n_2$ |
| N | $N_1 + N_2$ |

According to an embodiment, the binary analysis module 120 may calculate the complexity on the basis of Formula 1 below.

$$H.D = \frac{n_1}{2} \times \frac{N_2}{n_2} \quad \text{[Formula 1]}$$

Here, H.D means complexity.

After that, in step S430, the binary analysis module 120 calculates the risk on the basis of the complexity, and may determine the priority of the route on the basis of the calculated risk. According to an embodiment, the binary analysis module 120 may calculate the risk on the basis of Formula 2 below.

$$H.V = N \times \log_2 n \quad \text{[Formula 2]}$$

-continued $$E = H.D \times H.V$$

$$H.B = \frac{E^{\frac{2}{3}}}{3000}$$

$$\text{Exp} = H.B \times \sum_{i=1}^{n} (v_i + 1)$$

Here, Exp means the risk of the route, n means the count of calls to the vulnerable function, and $v_i$ means the product of the count and the potential risk of the system call called by the vulnerable function. The binary analysis module 120 determines the priority on the basis of the calculated risk, and may update the binary information stored in the storage 330 on the basis of the determined priority. That is, the route priority may be set to be higher as the route calls a lot of functions with vulnerable security.

Here, the potential risk of system calls may be dictionary-defined values for each function. For example, as the potential risk, a dangerous function may be defined as 0.5, and banned function may be defined as 1 in advance, as illustrated in Table 2 below.

TABLE 2

| Potential risk | Function |
| --- | --- |
| Dangerous (0.5) | scanf, fscanf, vscanf, vsscanf, sscanf, vfscanf, snprintf, vsnprintf, strtok, wcstok, itoa |
| Banned (1.0) | strcpy, wcscpy, stpcpy, wcpcpy, strecpy, memcpy, strcat, wcscat, streadd, strtrns, sprintf, vsprintf, vprintf, vfprintf, gets, getwd, realpath, syslog, vsyslog, fprintf, printf, sprintf, vfprintf, vprintf, vsprintf, vasprintf, asprintf, vdprintf, dprintf |

After that, in step S440, the binary analysis module 120 may determine whether or not the route for calculating the complexity is suitable as a target for performing the route detection. According to an embodiment, the binary analysis module 120 may determine that the route is suitable for the target for performing the route detection, when complexity of the route is less than a first threshold value, and the value obtained by counting branches in which the route passes on the control flow graph is less than a second threshold value. When the route is determined to be suitable for the route detection, the route detecting module 130 may perform the route detection of that route. If the route is not suitable for route detection, the vulnerability detecting system 100 may continue the vulnerability detection by the vulnerability detecting module 110, without executing the route detection. That is, according to the present embodiment, when the count of branches included in the route is set as B, only when the following formula 3 is satisfied, the vulnerability detecting system 100 may perform the route detection of that route.

$$(H.D < x) \cap (B < y) \qquad \text{[Formula 3]}$$

Here, x means a first threshold value, and y means a second threshold value. The first threshold value and the second threshold value may be adjusted to appropriate values in accordance with the embodiment.

FIG. 7 is a diagram for explaining the operation of the route detecting module according to an embodiment of the present invention.

According to an embodiment, the route detecting module 130 may perform Symbolic Execution 510 to perform the route detection. The symbolic execution 510 means a method of analyzing an execution route of an input value of a program. The route detecting module 130 may generate a new input value, by executing the route detection 520 on the basis of the route formula acquired as a result of executing the symbolic execution 510.

In order to execute the symbolic execution 510, the route detecting module 130 may convert the binary information into an interlanguage in step S511. After that, in step S512, the route detecting module 130 may generate a symbolic state to assign a symbol value to an input variable in the program unit. Thereafter, the route detecting module 130 may execute the symbolic state generated in step S513. The route detecting module 130 may generate a route formula in step S514 as a result of executing the symbolic state.

In order to execute the route detection 520, in step S521, the route detecting module 130 may generate an abstract syntax tree (AST) on the basis of the route formula generated as a result of the symbolic execution 510. The abstract syntax tree may be simply called a syntax tree, which means a tree of an abstract syntax structure of a source code written in a programming language. Each node of the abstract syntax tree indicates a structure generated in the source code. The expression that the syntax is abstract means that all the detailed information displayed in the actual syntax is not represented.

After that, in step S522, the route detecting module 130 may generate a new test case in step S523 by solving constraints of the generated abstract syntax tree. The generated new test case may be stored in the storage unit 330. According to an embodiment, the route detecting module 130 may apply a satisfiability modulo theories solver (SMT solver) to the abstract syntax tree to solve the constraints in step S522.

Figure 8:
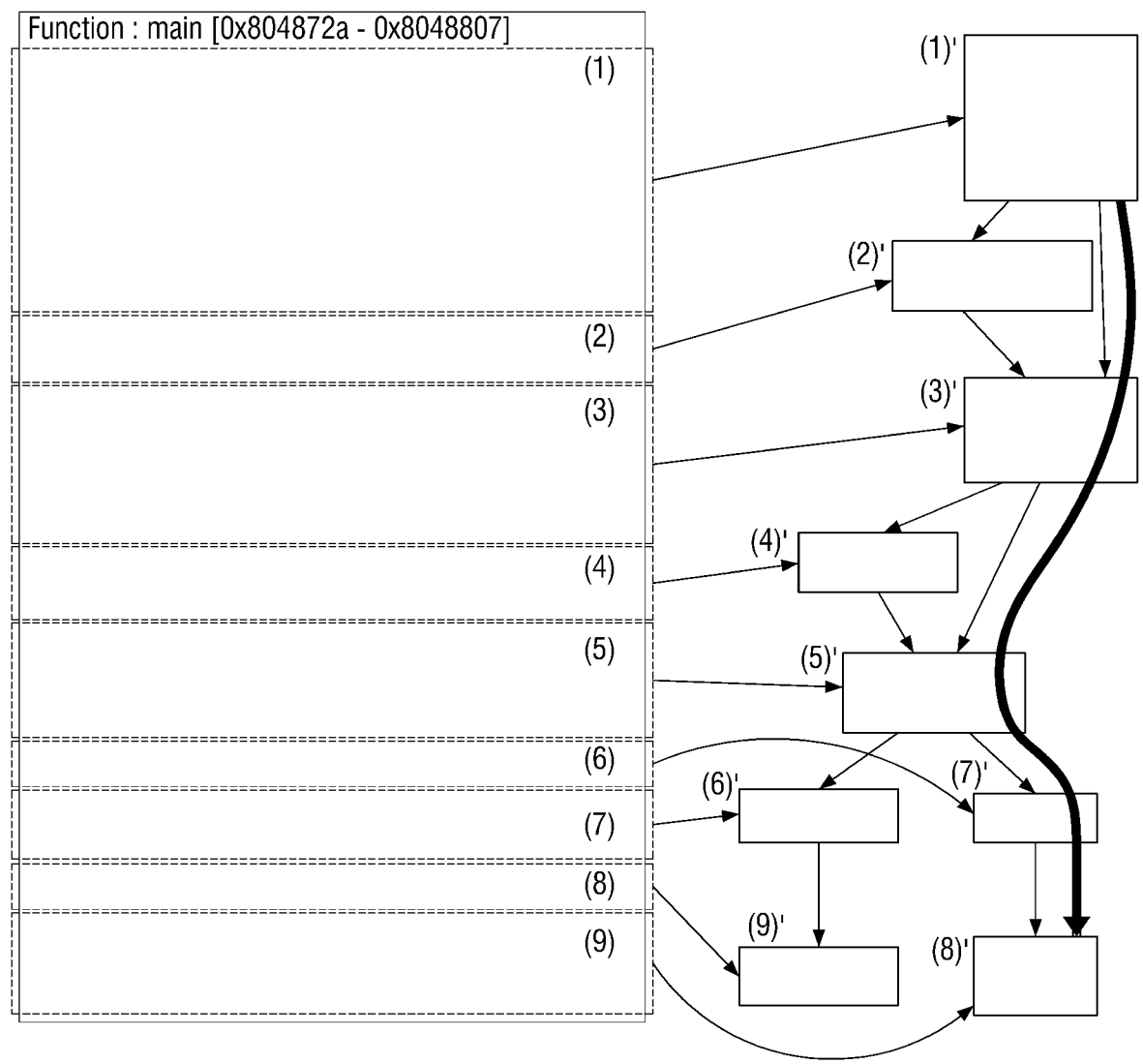

FIGS. 8 and 9 are exemplary views for explaining a method of restoring a control flow graph in accordance with an embodiment of the present invention.

Boxes (1)-(9) on the left side of FIG. 8A are illustrating the structure of the assembly code of the route, and boxes (1)'-(9)' on the right side of FIG. 8 are illustrating the structure of the restored control flow graph. (1) and (1)' of FIG. 9 are examples of codes omitted in (1) and (1)' of FIG. 8.

According to an embodiment, the binary analysis module 120 may restore the control flow graph as illustrated by boxes (1)'-(9)' of FIG. 8 on the basis of the assembly code as illustrated by boxes (1)-(9) of FIG. 8.

For example, when the program is executed in the route of (1)', (3)', (5)', (7)', and (8)', the binary analysis module 120 may determine that the count B of the branch is 4, and may calculate the complexity and the risk of the route on the basis of the functions called while the program is executed along the route.

Figure 11:
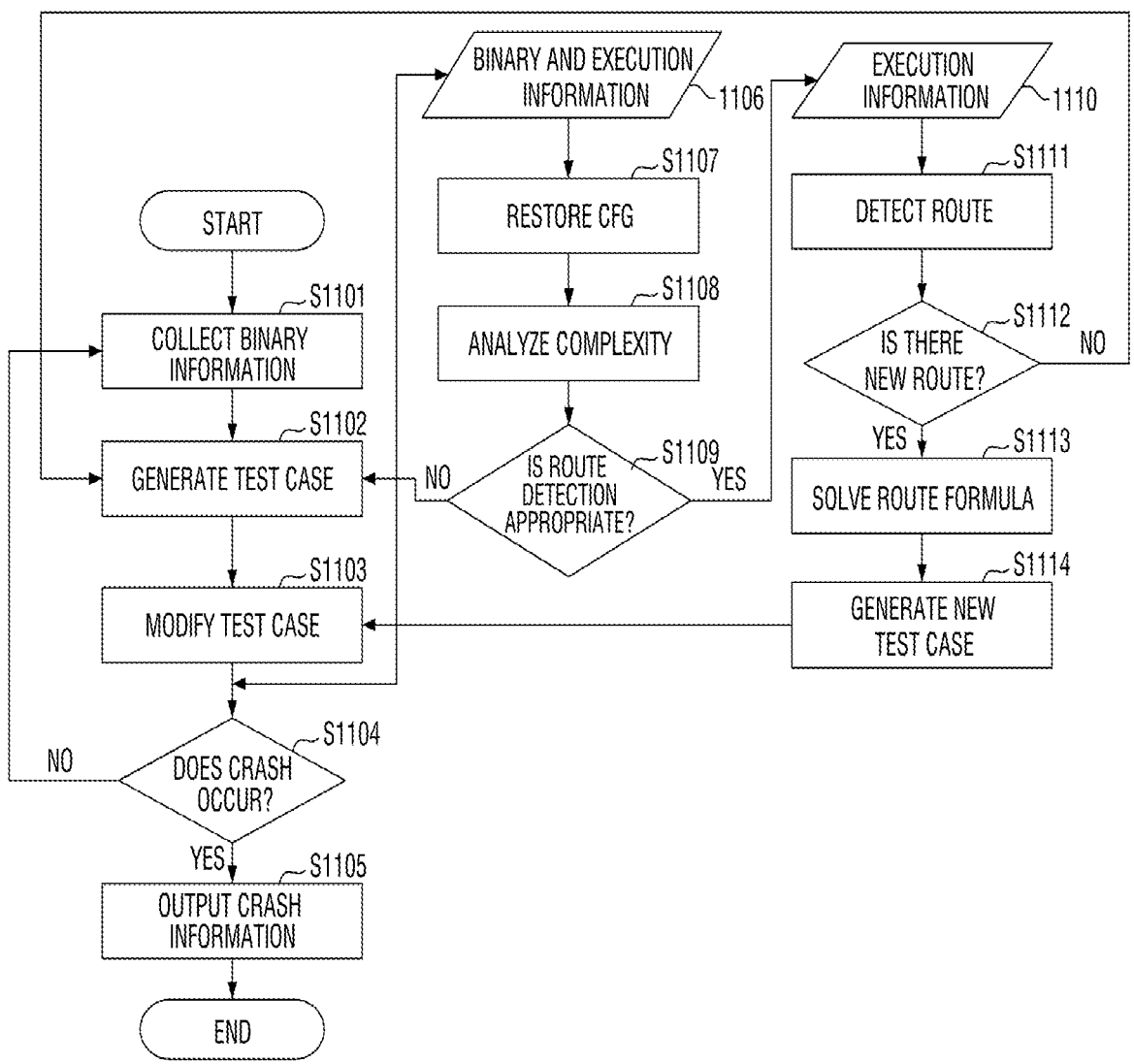
FIG. 11 is a flowchart illustrating a process of detecting vulnerability according to another embodiment of the present invention.

FIG. 11 is a flowchart illustrating a process of detecting vulnerability according to another embodiment of the present invention.

First, the vulnerability detecting system may collect binary information of a program for detecting vulnerability in step S1101. After that, the vulnerability detecting system may generate a test case for executing the fuzzing in step S1102. The vulnerability detecting system may determine whether or not a crash occurs by modifying the test case generated in step S1103.

Further, the vulnerability detecting system may restore the control flowchart graph, on the basis of the binary information and execution information 1106 acquired to detect vulnerability in step S1107. After that, the vulnerability detecting system may analyze the complexity of route, on the basis of the control flowchart graph in step S1108.

The vulnerability detecting system may determine whether to perform a route detection, by determining whether the route is suitable for route detection on the basis of the route complexity in step S1109. If the route is not suitable for the route detection, the vulnerability detecting system may continue the vulnerability detection by executing step S1102, without executing the route detection.

When the route is suitable for the route detection, the vulnerability detecting system may perform the route detection on the basis of the execution information 1110 in step S1111. Further, the vulnerability detecting system may determine whether the route is a new route that has never executed the route detection in step S1112. If the route is not a new route, the vulnerability detecting system may execute the step S1112 again, without continuing the route detection. If the route is a new route, the vulnerability detecting system may solve the route formulas in step S1113. The vulnerability detecting system may generate a new test case as a result of solving the route formula in step S1114. Thereafter, the vulnerability detecting system may determine whether or not a crash occurs by executing the step S1103 on the new test case.

In step S1104, if no crash occurs, the vulnerability detecting system may execute the step S1101 again. Also, if a crash occurs in step S1104, the vulnerability detecting system may output the crash information on the crash that has occurred.

The method according to the embodiments of the present invention described so far may be executed by the execution of a computer program implemented as computer-readable code. The computer program may be transferred to a second computing device from a first computing device via a network such as Internet and installed on the second computing device. Thus, the computer program may be used in the second computing device. The first computing device and the second computing device include all of a server device, a physical server belonging to a server pool for a cloud service, and a fixed computing device such as a desktop PC.

The aforementioned computer program may be stored on a recording medium such as a DVD-ROM or a flash memory device.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

The concepts of the invention described above with reference to FIGS. 3 to 7 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for detecting vulnerability, executed by a processor of a computing device, the method comprising:
   generating binary information including route information indicating an execution route of a program on a first test case;
   acquiring first crash information including the first test case and the route information when a crash of the first test case occurs;
   restoring a control flow graph based on the binary information;
   calculating complexity of a component of the execution route based on the restored control flow graph to determine whether the execution route is suitable as a target for performing a route detection on the route information;
   determining whether the complexity is less than a threshold value; only when a result of the determination indicates that the complexity is less than the threshold value, performing: executing the route detection on the route information; generating a second test case by executing the route detection, wherein the second test case has characteristics of a higher possibility of crash occurrence than a possibility of crash occurrence of the first test case; executing a vulnerability detection of the second test case; and acquiring a second crash information including the second test case and the route information; and
   outputting the first crash information or the second crash information to another external computing device.

2. The method of claim 1, wherein the calculating the complexity calculates complexity based on the following formula, $$H.D = \frac{n_1}{2} \times \frac{N_2}{n_2}$$

H.D is the complexity, $n_1$ is the number of distinct operators, $n_2$ is the number of distinct operands, and $N_2$ is the number of whole operands.

3. The method of claim 1, wherein the generating the second test case comprises:
   generating an abstract syntax tree based on the generated route formula; and
   generating the second test case by solving constraints of the abstract syntax tree.

4. A non-transitory computer readable recording medium storing a computer program coupled to a computer device including a processor to execute a method of detecting vulnerability, the program being configured to execute operations comprising:
- generating binary information including route information indicating an execution route of a program on a first test case;
- acquiring first crash information including the first test case and the route information when a crash of the first test case occurs;
- restoring a control flow graph based on the binary information;
- calculating complexity of a component of the execution route based on the restored control flow graph to determine whether the execution route is suitable as a target for performing a route detection on the route information;
- determining whether the complexity is less than a threshold value; only when a result of the determination indicates that the complexity is less than the threshold value, performing: executing the route detection on the route information; generating a second test case by executing the route detection, wherein the second test case has characteristics of a higher possibility of crash occurrence than a possibility of crash occurrence of the first test case; executing a vulnerability detection of the second test case; and acquiring a second crash information including the second test case and the route information; and
- outputting the first crash information or the second crash information to another external computing device.

* * * * *